United States Patent [19]

Wrue

[11] 4,136,466
[45] Jan. 30, 1979

[54] ARTIFICIAL INTRAOCULAR LENS TRAINING DEVICE

[75] Inventor: Richard J. Wrue, Greece, N.Y.

[73] Assignee: Bausch & Lomb Incorporated, Rochester, N.Y.

[21] Appl. No.: 853,151

[22] Filed: Nov. 21, 1977

[51] Int. Cl.$^2$ .............................................. G09B 23/34
[52] U.S. Cl. ......................................... 35/17; 350/252
[58] Field of Search ..................... 35/17, 49; 350/252, 350/257

[56] References Cited

U.S. PATENT DOCUMENTS

| | | | |
|---|---|---|---|
| 3,177,593 | 4/1965 | Loeb | 35/17 |
| 3,220,300 | 11/1965 | Von Huene | 350/252 X |
| 3,520,071 | 7/1970 | Abrahamson | 35/17 |
| 3,905,130 | 9/1975 | Gordon | 35/17 |

Primary Examiner—Harland S. Skogquist
Attorney, Agent, or Firm—Frank C. Parker; Robert S. Beiser

[57] ABSTRACT

An apparatus for providing an adjustable aperture used in the practice of simulated artifical intraocular lens insertion comprising; a flexible diaphragm with a circular aperture therethrough, a cylindrical diaphragm mount for supporting the diaphragm, a diaphragm control member within the mount, and means for moving the control member against the diaphragm, thereby stretching the diaphragm and expanding the size of the circular diaphragm aperture. The size of the aperture is increased or reduced in order to simulate the pupil of the eye in various stages of dilation. The flexible diaphragm member is used to simulate the iris, so that an artificial intraocular lens may be inserted through the circular aperture and mounted on the flexible diaphragm member, thereby simulating the mounting of such a lens to the iris of the human eye.

9 Claims, 3 Drawing Figures

ARTIFICIAL INTRAOCULAR LENS TRAINING DEVICE

BACKGROUND OF THE INVENTION

This invention relates generally to an apparatus for providing an adjustable aperture, and more specifically to a device for the simulation of artificial intraocular lens insertion utilizing such an adjustable aperture.

The concept of using intraocular lenses for the correction of aphakia has a long history. Much of the pioneering work was performed by Harold Ridley in London and by Cornelius Binkhorst in the Netherlands. A comprehensive history of the development and results of the intraocular implant lens is presented in a thesis by Marcel Eugene Nordlohne, reproduced in Documenta Ophthalmologica, Volume 38, Issue 1, 16 December 1974. Additionally useful is *A Lens For All Seasons* by Dr. Jerald L. Tennant published in August of 1976.

Despite improvements in intraocular lens technology, problems have continued to plague the development of implant practice. The size of the dilated pupil, and the delicacy of the iris combine to make the implantation of an artificial intraocular lens extremely difficult. In particular, the ability to implant such a lens in the eye can only be learned through repeated practice upon actual human eyes, a risky training procedure. In addition, it is frequently desirable to demonstrate to medical students and others the insertion of an intraocular lens. Such demonstrations are difficult to conduct on actual human patients. Accordingly, objects of the present invention are;

to provide an appartus for simulation of artificial intraocular lens insertion;

to provide such an apparatus with an adjustable iris mechanism so that the insertion of such lenses may be simulated on apertures of various diameters in order to correspond to the dilation of the human pupil to various diameters; and to provide such an apparatus in a form which is inexpensive to manufacture and easy to use.

SUMMARY OF THE INVENTION

The present invention is a device for providing an adjustable aperture and is used in practicing the insertion of artificial intraocular lenses. The invention comprises a flexible diaphragm having a circular aperture in its center. A cylindrical diaphragm mount is provided to support the diaphragm. A diaphragm control member is positioned within the diaphragm mount and is disposed for movement therein. This movement causes stretching of the diaphragm and dilation of the aperture when the control member is moved towards the diaphragm, and contraction of the diaphragm and shrinking of the aperture when the control member is moved in the opposite direction. A mechanism for effecting this movement in a controlled manner is also provided. In a preferred embodiment of the invention, the diaphragm is used to simulate the iris of the human eye, and the circular aperture is used to simulate the pupil of that eye.

In a preferred embodiment of the invention the flexible diaphragm member comprises a circular plastic sheet. A rib is integrally formed near the peripheral edge of one side of the plastic sheet and provides means for mounting the flexible diaphragm member. The plastic sheet is reinforced around the circular aperture so that as the diaphragm is stretched and the aperture dilated, the sheet will not tear. In a preferred embodiment of the invention the circular plastic sheet is comprised of low density polyethylene, 10mm thick.

In a preferred embodiment of the invention the cylindrical diaphragm mount comprises a cylindrical body having an open cylindrical cavity in one end to contain the diaphragm control member, and a circular aperture through the remainder of the cylinder. An annular channel is formed around this open end of the mount for mating with the rib formed in the diaphragm. A diaphragm ring is mounted on top of the diaphragm to act as a pressure plate. The diaphragm ring is open in the center to permit stretching of the diaphragm therethrough. A cylinder cap is threadedly attached to the diaphragm mount for holding the diaphragm and ring to the mount. The open cylindrical cavity also contains a rod shaped vertically mounted key on one side for slidably interlocking the diaphragm mount to the diaphragm control member. This key allows the diaphragm control member to slide vertically within the cavity, but to rotate in correspondence with the diaphragm mount.

In a preferred embodiment of the invention, the cylindrical diaphragm control member comprises a stepped cylindrical block having rounded shoulders at one end for contact with the diaphragm, when the diaphragm control member is moved towards the diaphragm. The stepped cylindrical block as a circular bore through its length, with a portion of that bore threaded. This circular bore is used to simulate the interior of the eye. The stepped cylindrical block also has a keyway on the outside for slidably interlocking with the key in the cavity of the diaphragm mount.

In a preferred embodiment of the invention, the means for selectively effecting movement of the diaphragm control member with the diaphragm mount comprises a screw threaded through the threaded portion of the bore in the diaphragm control member and slid through the circular aperture running from the bottom of the cavity in the diaphragm mount to the opposite end of the mount. With this screw in position, when the diaphragm mount is rotated about the screw, the interlocking key and keyway causes the diaphragm control member also to rotate. However, the control member is threaded onto the screw, so rotation causes it to spiral upward or downward depending on the direction of rotation. The diaphragm mount remains stationary relative to the longitudinal axis of the screw. Therefore, the diaphragm control member moves either toward or away from the diaphragm, causing corresponding stretching or contraction of the diaphragm and dilation or reduction of the diaphragm aperture. Finally, a base is required to fixedly position the screw so that it will not rotate when the diaphragm mount is rotated.

In a preferred embodiment of the invention the base comprises a disc shaped base member having a circular aperture through its center for telescopic reception of the end of the screw. A shoulder is formed on the outside of the screw for supporting and positioning the screw on the base member. Through a circular aperture in the screw a pin is inserted. The aperture runs perpendicular to the longitudinal axis of the screw. The pin extends from both ends of the aperture. A slot in the top of the base member is designed to receive the extending ends of the pin and fixedly restrain them, thereby preventing rotation of the screw.

DETAILED DESCRIPTION OF THE PREFERRED EMBODIMENT

Figure 1:
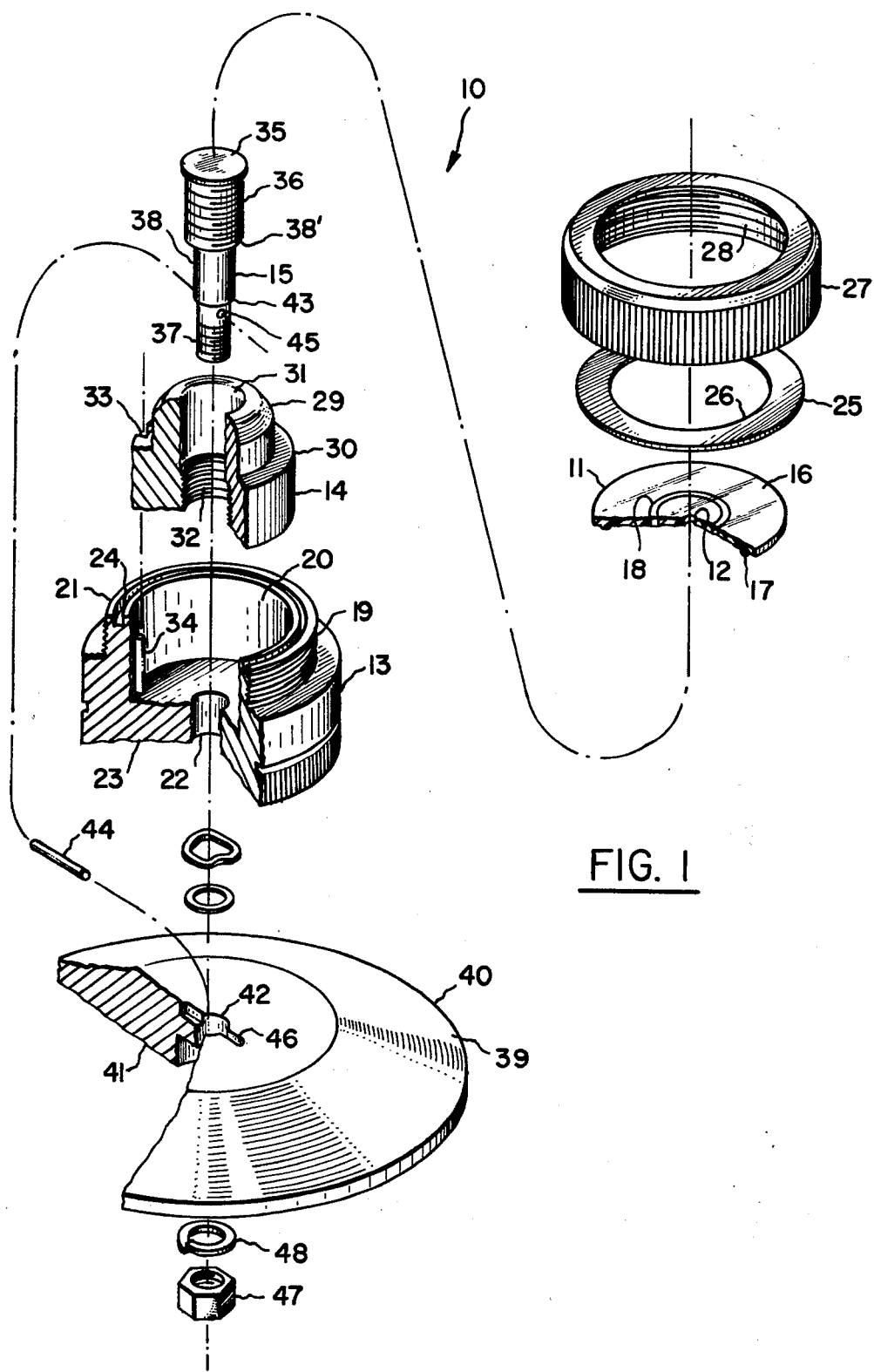
FIG. 1 of the drawings is a perspective exploded view, partially broken away, of an apparatus for the practice of mounting artificial intraocular lenses on a simulated iris.
Figure 2:
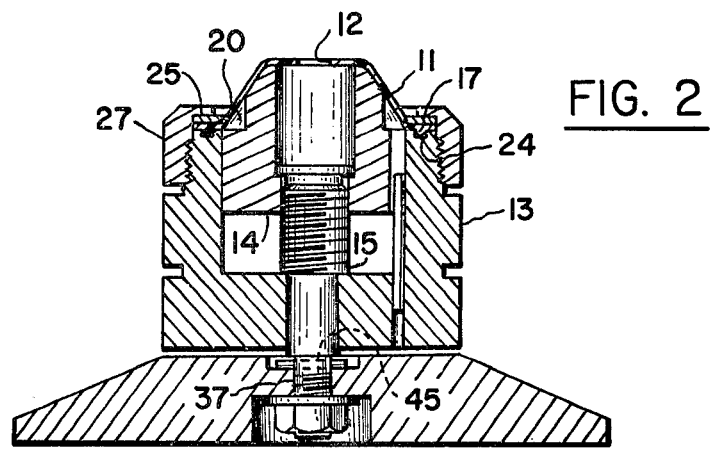
FIG. 2 of the drawings is a front sectional view of one embodiment of the invention, showing in particular, a flexible diaphragm member being stretched by diaphragm control means, thereby dilating the circular aperture in the flexible diaphragm, which corresponds to dilation of the pupil in a human eye.

An apparatus 10 for providing an adjustable aperture, as shown in FIG. 1 comprises a flexible diaphragm member 11 having a circular aperture 12 therethrough. Diaphragm 11 is used in a preferred embodiment to simulate the human iris and aperture 12 is used to simulate the pupil of the eye. A cylindrical diaphragm mount 13 supports diaphragm 11. A cylindrical diaphragm control member 14 is disposed for movement within diaphragm mount 13, such movement effecting stretching of diaphragm 11 and enlargement of aperture 12 when control member 14 is moved toward diaphragm 11, and permitting contraction of diaphragm 11 and shrinking of aperture 12 when control member 14 is moved away from diaphragm 11. Apparatus 10 further includes means 15 for selectively effecting movement of diaphragm control member 14 within diaphragm mounting means 13.

In one embodiment of the invention the flexible diaphragm member 11 comprises a circular plastic sheet member 16 having rib means 17 integrally formed near the peripheral edge of plastic sheet 16 for mounting flexible diaphragm 11. Aperture reinforcement means in the form of an annular integral rib 18 are formed in plastic sheet. The rib 18 is disposed slightly spaced from and around the circular aperture 12 for preventing the tearing of flexible diaphragm member 11 when circular aperture 12 is dilated.

As shown in FIG. 1 of the drawings, the cylindrical diaphragm mount 13 includes a raised rim member 19 having a cylindrical cavity 20 therethrough at one end 21 of diaphragm mount 13 and a central circular aperture 22 at the other end 23. An annular channel 24 is integrally formed in the one end 21 for mating with rib 17 of diaphragm 11, thereby retaining diaphragm 11 in place. A diaphragm retainer ring 25 is mounted on top of diaphragm 11 to act as a pressure plate, holding diaphragm 11 in place. The diaphragm retainer ring 25 has an outside diameter approximately the same as the internal diameter of diaphragm 11. A circular aperture 26 in the center of ring 25 has an inside diameter slightly smaller than the diameter of cavity 20. Cap means 27 is attached to the end 21 of diaphragm mount 13 for holding the diaphragm retainer ring 25 and the diaphragm 11 in place on the diaphragm mount 13. Cap means 27 also has a center opening 28 approximately the same diameter as the inside diameter of cavity 20. Openings 26 and 28 allow the end 29 of cylindrical diaphragm control member 14 to extend therethrough, while flexible diaphragm 11 is held in place, thereby stretching diaphragm 11.

The cylindrical diaphragm control member 14 is in the form of a stepped cylindrical block 30, rounded at one end 29 for contact with diaphragm 11 upon movement of control member 14 toward diaphragm 11. The diaphragm control member has a cylindrical central bore 31 having a lower portion 32 threaded for engagement with means 15 for selectively effecting movement of diaphragm control member 14 in relation to the diaphragm mount 13. Control member 14 also includes keyway means 33 for slidably interlocking control member 14 with diaphragm mount 13. Keyway means 33 receives a key 34 mounted in diaphragm mount 13 so that when diaphragm mount 13 is rotated, control member 14 also rotates, but is free to move vertically.

Means 15 for selectively effecting movement of control member 14 with diaphragm mount 13 comprises a screw — screw means 35 having threaded portions 36 and 37 and smooth portion 38. Screw 35 is threaded into internally threaded aperture 32 so that flange 38' of screw 35 seats against the bottom of cavity 20. The screw 35 is rotatable within circular aperture 22, when smooth portion 38 of screw 35 is located within circular aperture 22. This disposition of screw 35 allows diaphragm mount 13 to rotate around portion 38 of screw 35. Such rotation is transmitted by key 14 through keyway 33 to control member 14 which causes it also to rotate.

Base 39 is a disc shaped member 40 having a flat bottom 41. Base 39 has a circular aperture 42 through its center for receiving screw means 35. Shoulder means 43 integrally formed on srew means 35 supports screw 35 on base member 39. A pin 44 extends through an aperture 45 in screw 35 and extends out of aperture 45 at both ends. When screw 35 is inserted into base 39, pin 44 is aligned with a pin slot 46. Pin slot 46 prevents pin 44, and screw 35 from rotating. Nut 47 and lock washer 48 are threaded onto screw 35 at threaded portion 37 after the screw 35 has been inserted through aperture 42; and hold screw 35 in place.

Screw 35 is held stationary by base 39. Screw 35 being stationary, and threaded portion 36 of screw 35 being mounted in threaded aperture 32, rotation of control member 14 around screw 15 causes control member 14 to spiral upward or downward along screw 15. Upward movement pushes rounded end 39 of control member 14 into diaphragm 11 thereby stretching diaphragm 11 and dilating circular aperture 12. Downward movement of control member 14 causes relaxation of diaphragm 11 and contraction of circular aperture 12.

As is clear from the drawings, diaphragm 11 is supported by diaphragm mount 13. In particular, rib 17 rests within annular channel 24. Diaphragm retainer ring 25 rests atop diaphragm 11. Cap 27 holds ring 25 and diaphragm 11 in place. Diaphragm control member 14 telescopes from cavity 20 upon rotation of members 13 and 14 so that diaphragm 11 is stretched and circular aperture 12 is dilated.

Figure 3:
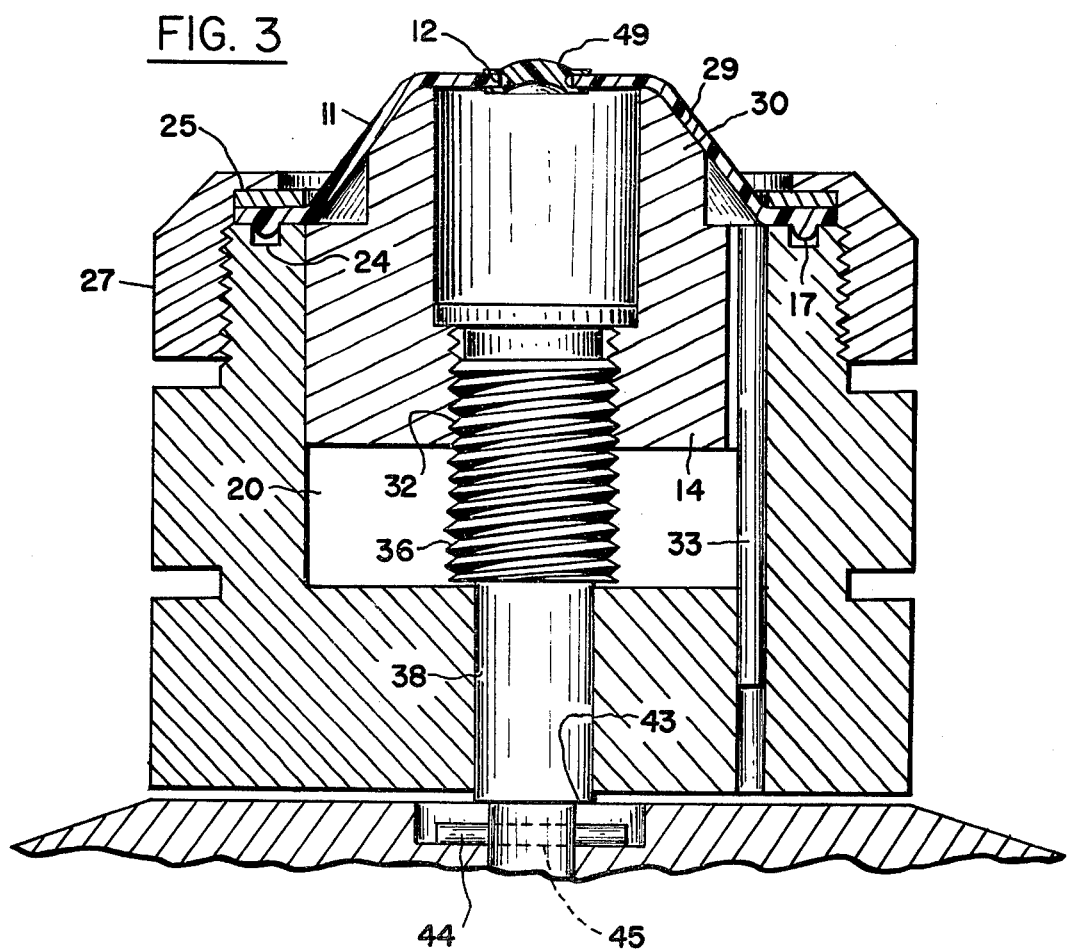
FIG. 3 of the drawings is an enlarged front sectional view of the upper portion of the embodiment of the invention shown in FIG. 2, showing in particular an artificial intraocular lens inserted in a simulated iris.

As shown in FIG. 3, upon the selective dilation of the diaphragm opening 12, an artificial intraocular lens 49 may then be mounted in circular aperture 12, so as to be supported by diaphragm 11.

What is claimed is:

1. An apparatus for providing an adjustable aperture, comprising:
    a flexible diaphragm having a circular aperture therethrough;

cylindrical diaphragm mounting means having said diaphragm peripherally secured thereto for supporting said flexible diaphragm;

a cylindrical diaphragm control member disposed for movement within said cylindrical diaphragm mounting means, said diaphragm control member effecting stretching of said diaphragm and enlargement of said aperture upon movement of said control member toward said diaphragm and permitting contraction of said diaphragm upon movement of said control member in the opposite direction; and means for selectively effecting movement of said diaphragm control member with respect to said diaphragm mounting means either towards said diaphragm or in the opposite direction to vary the size of said diaphragm aperture.

2. The invention according to claim 1 in which said apparatus is used as a device for the practice of artificial intraocular lens insertion and said flexible diaphragm member is used to simulate the iris of the human eye; and said circular aperture is used to simulate the pupil of the human eye.

3. The invention according to claim 1 in which said flexible diaphragm member comprises:

a circular plastic sheet member;

rib means integrally formed near the peripheral edge of said plastic sheet member for mounting said flexible diaphragm member; and aperture reinforcement means in the form of an annular integral rib formed in said plastic sheet member a distance apart from and around said circular aperture for preventing the tearing of said flexible diaphragm member when said circular aperture is dilated.

4. The invention according to claim 3 in which said circular plastic sheet member is comprised of 10 millimeter thick low density polyethylene.

5. The invention according to claim 1 in which said cylindrical diaphragm mounting means comprises:

a raised rim member having an open cylindrical cavity therethrough at one end of said diaphragm mounting means for receiving said cylindrical diaphragm control member, said cavity having a centrally located circular aperture at the other end, said cavity also having a key member disposed therein for slidably interlocking said diaphragm mounting means with said control member;

annular channel means integrally formed in said one end of said diaphragm mounting means for engaging said flexible diaphragm member;

a diaphragm ring member mounted atop said flexible diaphragm so as to act as a pressure plate against said diaphragm; and cap means attached to said one end of said diaphragm mounting means for holding said diaphragm ring member and said flexible diaphragm on said diaphragm mounting means.

6. The invention according to claim 1 in which said cylindrical diaphragm control member comprises:

a stepped cylindrical block rounded at one end, for contact with said flexible diaphragm upon movement of said control member toward said flexible diaphragm;

said stepped cylindrical block having a cylindrical bore with a portion thereof being threaded, for connection with said selectively effecting movement means; and keyway means for slidably interlocking said cylindrical diaphragm control member with said diaphragm mounting means.

7. The invention according to claim 1 in which said means for selectively effecting movement of said diaphragm control member with said diaphragm mounting means comprises:

screw means threaded through said diaphragm control member and rotatably mounted within said diaphragm mounting means for effecting said selective movement of said diaphragm control means relative to said diaphragm upon rotation of said diaphragm mounting means about said screw means; and base means for fixedly positioning said screw means.

8. The invention according to claim 7 in which said rotation of said diaphragm mounting means about said screw means causes said diaphragm control member to threadedly rotate on said screw means, thereby effecting movement of said control member either toward or away from said diaphragm.

9. The invention according to claim 7 in which said base means comprises:

a disc shaped base member having a circular aperture through its center for reception of said screw means therethrough;

shoulder means integrally formed in said screw means for supporting said screw means on said base member;

pin means for preventing rotation of said screw means on said base member; and lock means for fixedly attaching said screw means to said base member.

* * * * *